United States Patent [19]

Stummer

[11] Patent Number: 5,365,998
[45] Date of Patent: Nov. 22, 1994

[54] MEASURING, MONITORING AND REGULATION SYSTEM FOR DETERMINING THE LOCKING PRESSURE OR COLUMN FORCE AND/OR THE CASTING FORCE IN PRESSURE DIE CASTING MACHINES

[75] Inventor: Friedrich Stummer, Fellbach, Germany

[73] Assignee: Maschinenfabrik Mueller-Weingarten AG, Weingarten, Germany

[21] Appl. No.: 77,408

[22] Filed: Jun. 16, 1993

[30] Foreign Application Priority Data

Jun. 17, 1992 [DE] Germany ............................ 4219762
Sep. 25, 1992 [DE] Germany ............................ 4232179

[51] Int. Cl.[5] ...................... B22D 17/26; B22D 17/32
[52] U.S. Cl. ................ 164/154.1; 164/312; 164/150.1
[58] Field of Search ............. 164/4.1, 457, 113, 312, 164/150, 151, 154

[56] References Cited

U.S. PATENT DOCUMENTS

| 3,819,774 | 6/1974 | Eggenberger et al. ............ 164/4.1 |
| 4,466,477 | 8/1984 | Alofs ............................. 164/150 |

FOREIGN PATENT DOCUMENTS

| 356831 | 5/1980 | Austria . | |
| 0024518A1 | 3/1981 | European Pat. Off. . | |
| 0459947A2 | 12/1991 | European Pat. Off. . | |
| 1558277 | 3/1970 | Germany . | |
| 3020181 | 12/1980 | Germany . | |
| 3913820A1 | 10/1990 | Germany . | |
| 0107258 | 6/1983 | Japan ........................ | 164/4.1 |
| 0037257 | 2/1985 | Japan ........................ | 164/154 |
| 1220819 | 10/1986 | Japan ........................ | 164/150 |
| 0273923 | 12/1986 | Japan ........................ | 164/154 |
| 2160199 | 6/1990 | Japan ........................ | 164/151 |
| 2093759 | 9/1982 | United Kingdom ........... | 164/154 |

OTHER PUBLICATIONS

Ernst Brunnhuber, "Druckgiessmaschinen (Translation: Pressure Die Casting Machines)", *Praxis der Druckguss-fertigung* (Translation: *Pressure Die Casting Production Practice*,) 3rd Edit., 1980, pp. 28–41.

*Primary Examiner*—P. Austin Bradley
*Assistant Examiner*—Erik R. Puknys
*Attorney, Agent, or Firm*—Spencer, Frank & Schneider

[57] ABSTRACT

A diecasting machine includes a transverse member; a column passing through the transverse member; and a column nut mounted on the column and having an underface being in a face-to-face engagement with a surface area of the transverse member. The column nut applies, with its underface, pressure forces on the surface area of the transverse member. Such pressure forces are derived from forces generated in the diecasting machine, taken up by the column and transmitted by the column to the column nut. The transverse member has a measuring bore which is situated adjacent the surface area of the transverse member and which has an axis oriented transversely to the length dimension of the column. A measuring plug is accommodated in the measuring bore for detecting the pressure forces applied to the surface area by the underface of the column nut and for emitting signals representing magnitudes of the pressure forces. A regulating device receives the signals from the measuring plug for regulating diecasting operations of the diecasting machine as a function of the signals.

5 Claims, 3 Drawing Sheets

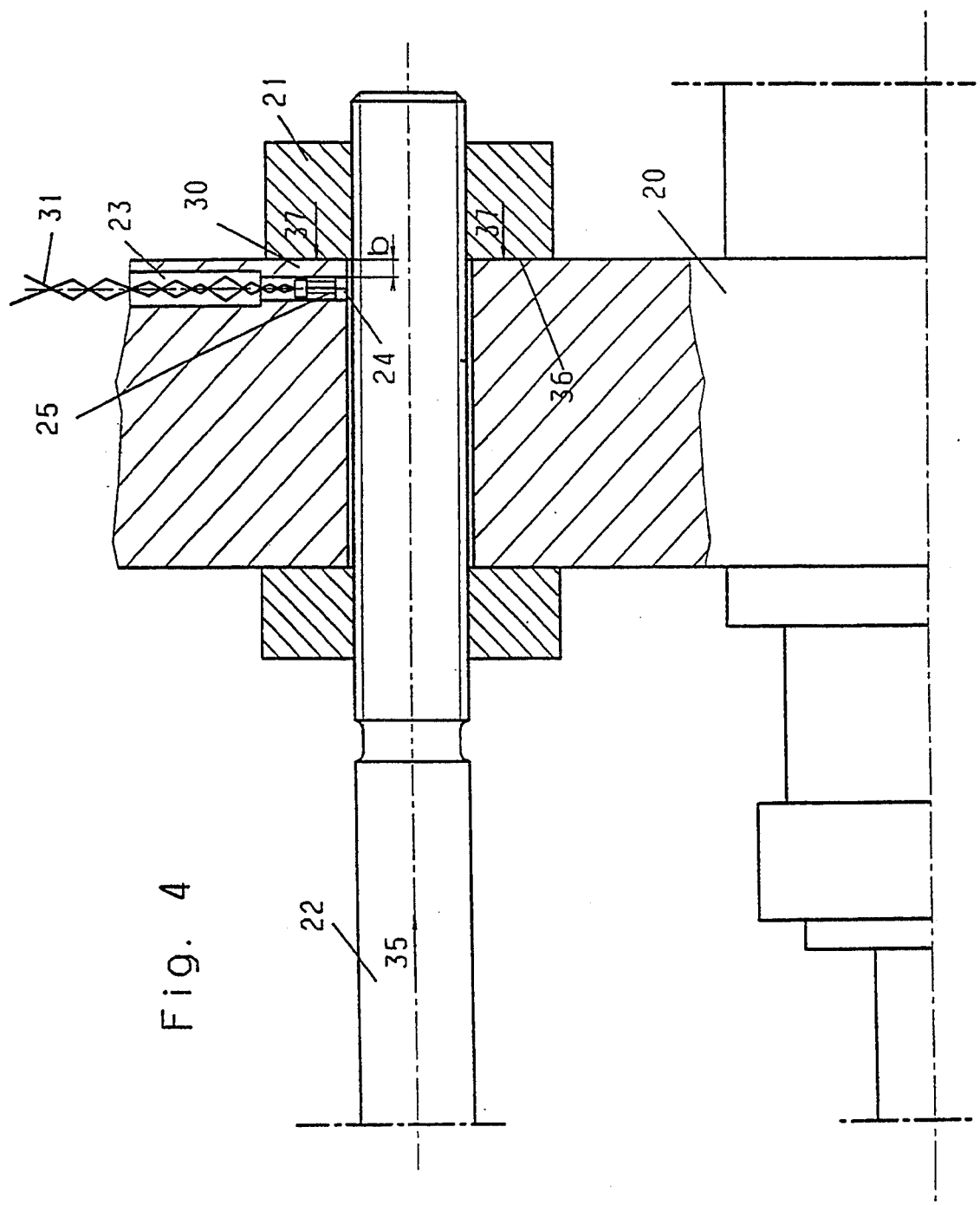

MEASURING, MONITORING AND REGULATION SYSTEM FOR DETERMINING THE LOCKING PRESSURE OR COLUMN FORCE AND/OR THE CASTING FORCE IN PRESSURE DIE CASTING MACHINES

BACKGROUND OF THE INVENTION

The invention relates to a measuring, monitoring and regulation system for determining the locking pressure, column force and/or casting force in pressure diecasting machines. In the zone of the column nut the system has a measuring device which detects the values to be measured and applies signals to a regulating device for adjusting the locking force, if required.

From the publication: Ernst Brunnhuber "Praxis der Druckgussfertigung" (Pressure Die casting Production Practice), 3rd Edition, 1980, the basic construction of pressure diecasting machines is known (pages 28 et seq.). Pressure diecasting machines accordingly consist essentially of two main groups of components, namely the die closing unit and the casting unit. Other groups of components comprise the ejector unit, the core puller, and the machine drive including its control means.

The die closing unit serves to open and close the die, that is to say to move the one movable half of the die and to produce the locking force during the casting. The fixed clamping plate here serves to receive the stationary half of the die and, in cold-chamber machines, also to receive the casting equipment comprising the casting chamber and casting plunger. The movable clamping plate receives the movable half of the die. The movable clamping plate is usually guided on four longitudinal columns or guide columns, the latter serving to receive the locking force generated by the die closing unit and also to guide the movable clamping plate.

The die closing unit may be driven by a hydraulic closing cylinder (purely nonpositive locking) or by a known double toggle lever system with a hydraulic closing cylinder as drive means for positive locking. The locking force must be sufficient to overcome the counter-forces occurring during casting. The die is accordingly subjected to prestressing which overcomes the casting forces. All positive locking systems require extremely accurate adjustment of the die height, that is to say the overall height of the entire pressure diecasting die parallel to the closing axis, in order to generate the required locking force when the die is closed. The entire closing mechanism must therefore be longitudinally adjustable, this being achieved in modern machines by means of electric motor-driven die height adjustment acting uniformly on all four columns. The rear column nuts, for example, serve in this case as adjusting nuts, which for example are operated by a geared motor by way of gearing.

The locking force generated in a toggle lever arrangement depends on the extended position of the toggle lever at a given moment and must not in any circumstances go beyond the top dead center position. The locking force achieved must therefore be determined very accurately. In known pressure diecasting machines this is achieved with the aid of known measuring and monitoring systems determining and monitoring the locking force. In practice the locking force is measured by means of the column expansion occurring in such arrangements. This can, for example, be done with the aid of a dial gauge installed at the end of the guide column and pressing by means of its feeler pin against a rod which is inserted into the bored column and does not participate in the expansion of the column. The amount of the expansion between the column nut and the fastening of the rod can thus be read on the dial gauge. This solution has the disadvantage that deep-hole drilling is required in the columns and thus electric lines must be connected and disconnected for the pulling or dismantling of the columns.

Another known possible way of detecting column expansion consists in fastening wire strain gauges on the guide columns. In addition, there are electronic monitoring devices which detect the column expansion or, in toggle lever closing units, the hydraulic pressure required in the closing cylinder for the extension of the joints.

The force on the columns of a pressure diecasting machine in continuous operation can also be detected by means of rings disposed under the column nuts and fitted with appropriate wire strain gauges. However, this solution has the disadvantage of being very expensive to construct and of being difficult to install and to remove.

Measuring and monitoring systems for the evaluation of the column force are also known, which compare the measured values with optimum values. In the event of a noteworthy divergence of the measured value, the stress in the columns is readjusted to the optimum values by automatic correction of the die height adjustment. Automatic regulation of the locking force can in this case be achieved by measuring the peak value of the closing pressure on the extension of a double toggle lever system in the closing unit, the measured value being brought in the regulation device into relationship with the actual locking force, displayed digitally and, if necessary, automatically corrected by stepping adjustment.

All known systems for measuring or monitoring the locking force in a pressure diecasting machine are relatively complicated in construction.

It is an object of the invention to provide a simplified measuring and monitoring system which meets the requirements existing at the present time and with which in addition the range of application is widened.

This object and others to become apparent as the specification progresses, are accomplished by the invention, according to which, briefly stated, the diecasting machine includes a transverse member; a column passing through the transverse member; and a column nut mounted on the column and having an underface being in a face-to-face engagement with a surface area of the transverse member. The column nut applies, with its underface, pressure forces on the surface area of the transverse member. Such pressure forces are derived from forces generated in the diecasting machine, taken up by the column and transmitted by the column to the column nut. The transverse member has a measuring bore which is situated adjacent the surface area of the transverse member and which has an axis oriented transversely to the length dimension of the column. A measuring plug is accommodated in the measuring bore for detecting the pressure forces applied to the surface area by the underface of the column nut and for emitting signals representing magnitudes of the pressure forces. A regulating device receives the signals from the measuring plug for regulating diecasting operations of the diecasting machine as a function of the signals.

The measuring, monitoring and regulation system according to the invention has the advantage over known arrangements that it has a very simple and effective construction. The system according to the invention then also makes it possible for variations, for example those caused by the action of temperature, to be corrected by appropriate regulation pulses. This system is based on the abandonment of direct measurement and evaluation of column expansion. On the contrary, pressure stresses which are proportional to the column force and thus to column expansion are detected by a pressure sensor. According to the invention the pressure sensor required is disposed in the region of the maximum pressure stresses acting on the casting machine. Heavy pressure stresses in the machine casing occur in particular in the region of the column nuts dictating the locking force.

Moreover, in addition to the measurement of the column force in continuous operation and therefore the determination of the locking force of the dies, the invention also provides for the casting force itself during continuous operation to be determined and evaluated. The casting force can thus be determined in accordance with the invention by setting the locking force to a fixed value or to zero before the die filling operation and by determining and evaluating the casting pressure in the die during the actual casting process as a casting force over and above said value.

According to the invention a corresponding measuring device is disposed in the region of the rear column nuts, which are in the form of adjusting nuts. Additionally or alternatively, the measuring device may also be provided in the front, fixed clamping plate for the die in the region of the column nuts provided there.

Finally, the invention provides for a corresponding measuring device for determining the casting force to be disposed on the casting equipment holder, and in particular on the casting part cross member situated there, near the support rod nuts.

BRIEF DESCRIPTION OF THE DRAWINGS

Further details of the invention can be seen in the following description of examples of embodiment and in the drawings, in which:

FIG. 4 shows more completely the detail Z in FIG. 1.

DESCRIPTION OF THE PREFERRED EMBODIMENTS

Figure 1:
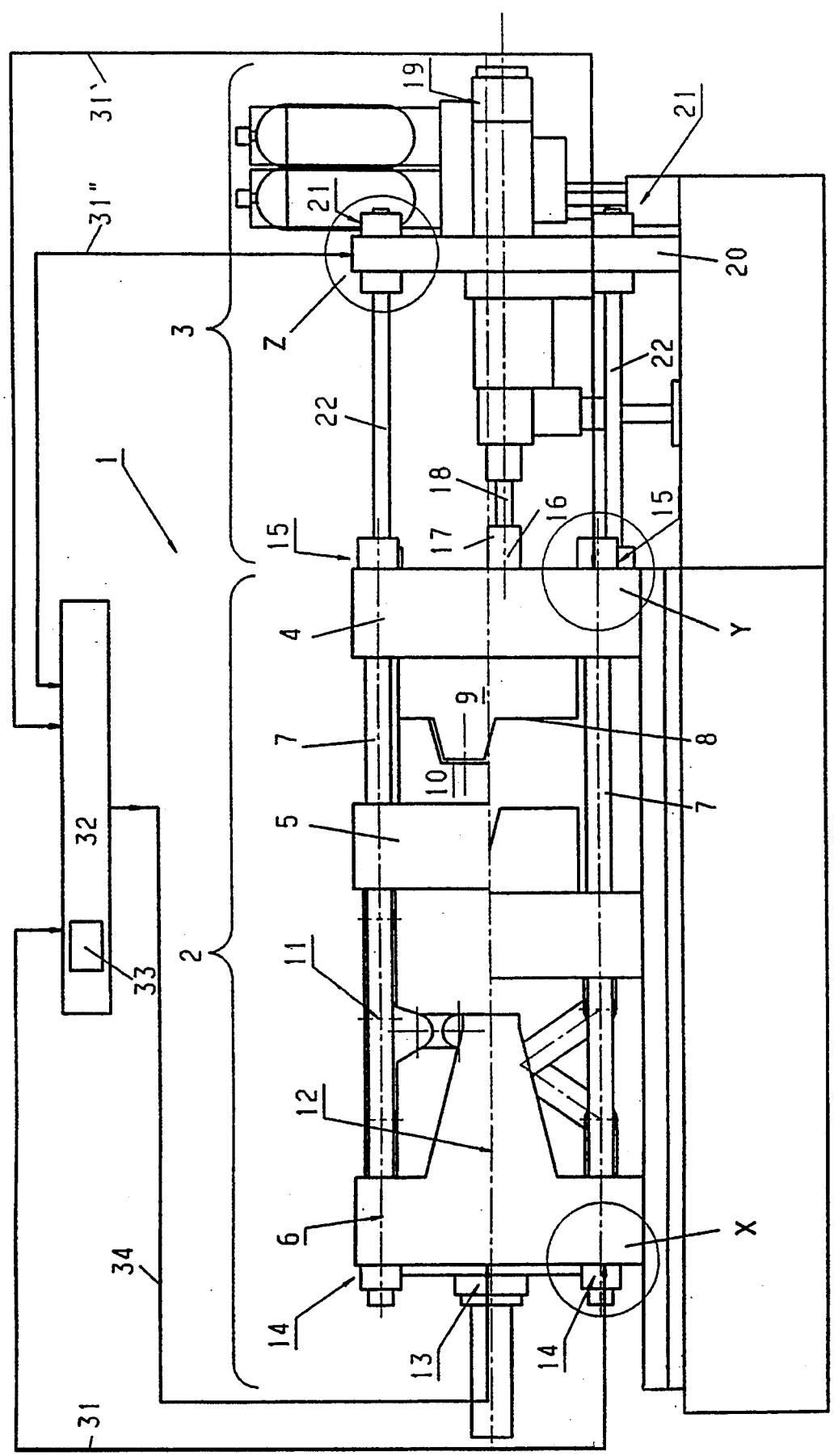
FIG. 1 is a schematic representation of a pressure diecasting machine with the arrangement, according to the invention, of pressure sensors in the positions indicated there.

The pressure diecasting machine 1 illustrated schematically in FIG. 1 consists of the two main component groups, namely the die closing unit 2 and the casting unit 3. The closing unit 2 comprises the fixed clamping plate 4, the movable clamping plate 5 and the rear cross member 6. The movable clamping plate 5 is guided by means of two top and two bottom columns 7, which are mounted in the front clamping plate 4 and the rear cross member 6 and are fastened by means of screw connections.

The pressure diecasting die 8, which consists of two halves, is fastened by its fixed half 9 on the fixed clamping plate 4 and by its movable half 10 on the movable clamping plate 5. The die halves 9, 10 are moved towards one another and held together by means of a double toggle lever system 11, the top half of FIG. 1 showing the closed position and the bottom half of FIG. 1 the open position of the die halves 9, 10. A plunger rod 12 moves the toggle lever system by means of a hydraulic piston and cylinder unit 13 in the axial direction. For the adjustment of the locking pressure on the die halves the rear column nuts 14 are in the form of adjusting nuts, which are operated by means of a toothed rim (not shown) in conjunction with a geared motor. Consequently, electric motor driven adjustment of the height of the die is possible. Reference is made to the relative work by Brunnhuber, Page 35, mentioned in this connection in the preamble above. The front column nuts 15 are disposed in fixed positions on the front fixed clamping plate.

The casting unit 3 illustrated schematically in FIG. 1 includes a casting chamber 16, with a casting plunger 17 slidable therein. The casting plunger rod 18 is operated by a casting plunger drive unit 19. The entire casting unit or casting equipment is fastened on a casting part cross member 20 by means of a screw connection 21. The casting part cross member is fastened by means of support rods 22 on the fixed clamping plate 4. The casting unit 3 is not shown separately in FIG. 1.

The present invention relates, for example in a pressure diecasting machine of this kind, to the measuring, monitoring and regulation system for detecting and controlling the locking force on the pressure diecasting die, and therefore the force on the column 7. In addition, the invention relates to a measuring device for measuring and evaluating the casting force during the actual casting operation. This relates in particular to the increase in force in the region of the closing unit and to the casting force alone in the region of the casting part cross member.

Figure 3:
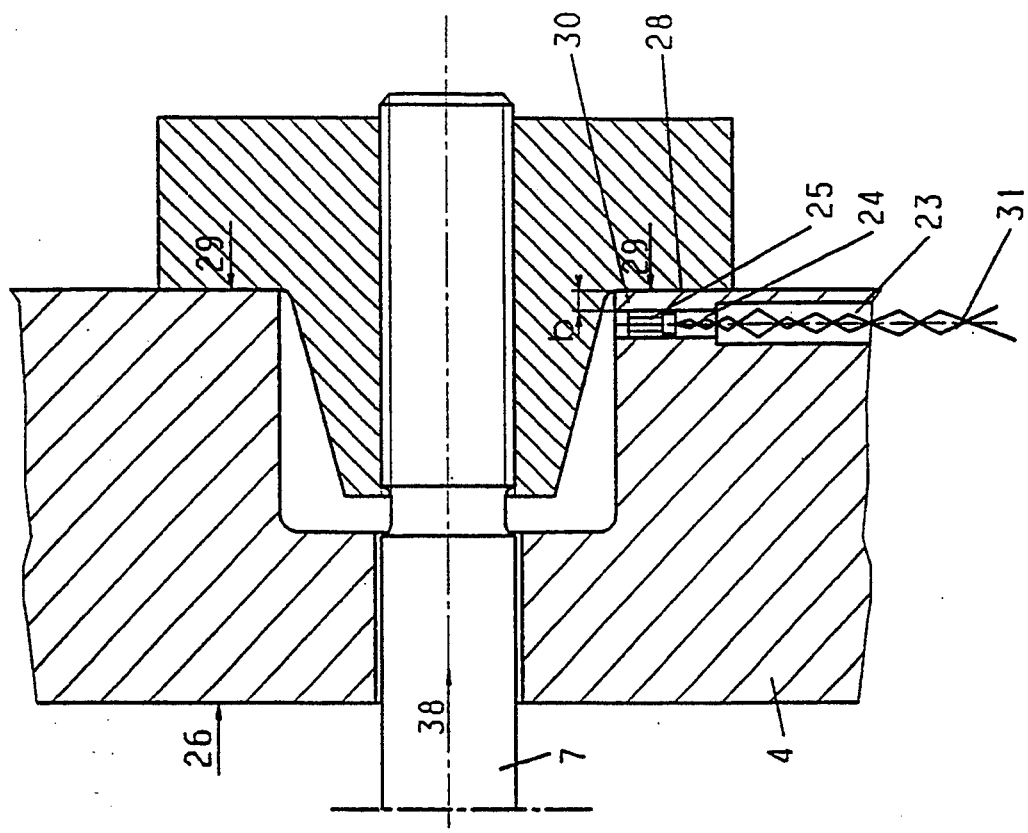
FIG. 3 shows more completely the detail Y in FIG. 1.
Figure 2:
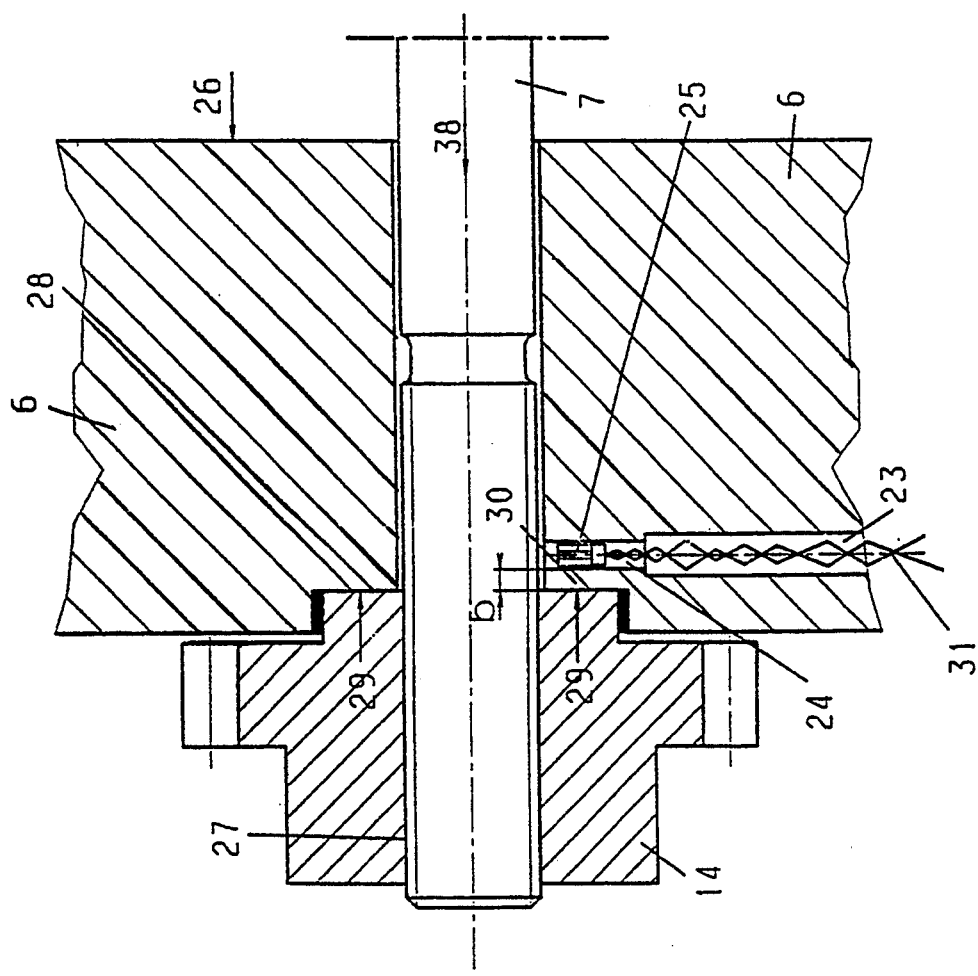
FIG. 2 shows more completely the detail X in FIG. 1.

The detail X and the detail Y in FIG. 1 are shown in FIGS. 2 and 3 respectively on a larger scale, illustrating their basic arrangements. The arrangement is shown only for column force measurement on one column 7. It can of course be applied similarly to all four columns 7.

The further description of details X and Y will be given with reference to FIGS. 2 and 3.

Detail X

In the cross member 6 a first larger bore 23 is formed, which has a top bore region 24, shown in FIG. 3, which is very accurately machined. A measuring plug 25 is inserted into this accurately machined bore region 24. The measuring plug 25 is accurately fitted to lie against the wall of the bore 24 under prestress. For this purpose a prestress is produced on the measuring plug 25 by means of a collet (not shown).

The locking force 26 acting on the cross member 6 is transmitted to the column nut 14. From the column nut or adjusting nut 14 this force is transmitted through the screw thread 27 to the column 7. The pressure force acting on the support surface 28 is given the reference 29. The pressure force 29 is propagated as a compressive stress through the thin cross member material 30, which has the thickness b, and acts on the fitting bore 24 containing the measuring plug 25. The measuring plug 25 thus installed can record measurement values acting in its radial direction, that is to say it is installed transversely to the direction of the force.

From the measuring plug 25 the signal proportional to compressive stress is transmitted via measuring lines 31 to a measuring and regulation device 32 and by means of a computer is there prepared in such a manner that the column force 38 can be read, for example in a display 33. The computer 32 can also process the measurement signal for regulation purposes and feed it via a regulation or control line 34 to the adjusting cylinder 13 or to the electric motor driven die height adjuster. This regulation can be effected if a desired value is exceeded or not attained.

FIG. 3 shows the detail Y in FIG. 1. The same arrangement as that described in connection with the detail X in FIG. 2 can accordingly also be provided in the fixed clamping plate 4. In the enlarged representation in FIG. 3 like parts are given the same reference numerals as in FIG. 2. The column force 38 to be measured in the column 7 acts once again via the fixed nut as a pressure force 29 on the stop surface 28. The compressive stresses are then transmitted via the narrow web 30 to the measuring plug 25 situated in the fitting bore 24. The measurement signal is transmitted via the measurement line 31' to the measuring and regulation device 32.

When the pressure diecasting machine is closed and the columns are thus expanded, the column force can be measured. For this purpose a relatively slight amplification is required in the electronic measuring system 32.

When the die cavity in the pressure diecasting die 8 is filled, the casting equipment 3 produces a further force, which leads to an increase of the closing force acting in the columns 7, that is to say the casting force is added to the closing force produced by the double toggle lever system. If after the die halves have been closed the column force has been adjusted as zero value in the measuring and regulation device 32 by a so-called reset, in the filling of the die this zero value set can be taken as starting point and the actual casting force can be measured. Since as a rule the casting force is less than about one tenth of the total column force, for the measurement of the casting force it is expedient to make use of amplification of the measuring and regulation device, that is to say to switch the appertaining electronic devices to a correspondingly higher sensitivity. The signal which is thus proportional to the casting force can be displayed and processed either as an individual value on the display 33 or in correspondingly expressed or displayed diagrams. The signal obtained can be used for further regulation purposes.

The embodiment shown in FIGS. 2 and 3 can of course also be used alternatively or, for monitoring purposes, also conjointly. A dual measuring device is thus available for each column 7.

In the example of embodiment illustrated in FIG. 4 the measurement principle according to the invention is applied to the casting equipment holder, that is to say to the casting part cross member 20 according to detail Z in FIG. 1. In this case a measurement is made of the casting force which results from the supporting of the casting unit 3 by means of the support rods 22. The casting plunger rod 18 presses the casting plunger 17, and therefore also the molten metal contained in the casting chamber 16, into the die 8 and is supported against the casting part cross member 20. The forces thus occurring are transmitted via the casting part support rods 22 to the fixed clamping plate 4.

The tensile force 35 produced in the support rod 22 is transmitted via the fixed nut 21 to the stop surface 36 of the support rod 22. This pressing force is indicated by the reference 37.

A measuring plug 25 is once again disposed in a fitting bore 24. The measurement lines 31" are taken out of the measurement bore by way of the bore 23. The force 37 transmits compressive stresses via the gap 30 to the measuring plug 25.

In all the variant embodiments the measuring plug according to details X to Z is accordingly inserted under the respective column nut or support rod nut. In the embodiment shown in FIG. 4 the casting force can thus be determined separately from the column locking force. When the casting equipment applies a force, this force acts on the support rod 22 disposed between the fixed clamping plate 4 and the casting part cross member 20. The pressure force 37, which acts as a compressive stress on the measuring plug 25, is accordingly produced under the support rod nut 21.

Measuring plugs are necessary as pressure sensors for the present invention. For this purpose use may for example be made of a measuring plug marketed by the Kistler Company, which is suitable for indirect force measurement in machine parts.

The invention is not restricted to the example of embodiment described and illustrated. On the contrary, it includes all further developments which are within the competence of those versed in the art and within the scope of the principle of the invention.

I claim:

1. In a diecasting machine including
   a transverse member;
   a column passing through said transverse member; said column having a length dimension; and
   a column nut mounted on said column and having an underface being in a face-to-face engagement with a surface area of said transverse member; said column nut applying, with said underface thereof, pressure forces on said surface area of said transverse member; the pressure forces being derived from forces generated in said diecasting machine, taken up by said column and transmitted by said column to said column nut;
   the improvement comprising
   (a) means for defining a measuring bore situated in said transverse member adjacent said surface area of said transverse member; said measuring bore having an axis oriented transversely to said length dimension of said column;
   (b) a measuring plug accommodated in said measuring bore for detecting the pressure forces applied to said surface area by said underface of said column nut and for emitting signals representing magnitudes of said pressure forces; and
   (c) regulating means for receiving said signals from said measuring plug and for regulating diecasting operations of the diecasting machine as a function of said signals.

2. The diecasting machine as defined in claim 1, further comprising a fixed rear cross member, a fixed casting part cross member spaced from said fixed rear cross member in a direction parallel to said length dimension; a fixed clamping plate receiving a fixed die half and disposed between said fixed rear cross member and said fixed casting part cross member; a movable clamping plate receiving a movable die half and disposed between said fixed rear cross member and said fixed casting part cross member; said movable clamping plate being displaceable toward and away from said fixed clamping plate in a direction parallel to said length dimension; said fixed rear cross member being said transverse member containing said measuring bore and said measuring plug in said measuring bore.

3. The diecasting machine as defined in claim 1, further comprising a fixed rear cross member, a fixed casting part cross member spaced from said fixed rear cross member in a direction parallel to said length dimension; a fixed clamping plate receiving a fixed die half and disposed between said fixed rear cross member and said fixed casting part cross member; a movable clamping plate receiving a movable die half and disposed between said fixed rear cross member and said fixed casting part cross member; said movable clamping plate being displaceable toward and away from said fixed clamping plate in a direction parallel to said length dimension; said fixed casting part cross member being said transverse member containing said measuring bore and said measuring plug in said measuring bore.

4. The diecasting machine as defined in claim 1, further comprising a fixed rear cross member, a fixed casting part cross member spaced from said fixed rear cross member in a direction parallel to said length dimension; a fixed clamping plate receiving a fixed die half and disposed between said fixed rear cross member and said fixed casting part cross member; a movable clamping plate receiving a movable die half and disposed between said fixed rear cross member and said fixed casting part cross member; said movable clamping plate being displaceable toward and away from said fixed clamping plate in a direction parallel to said length dimension; said fixed clamping plate being said transverse member containing said measuring bore and said measuring plug in said measuring bore.

5. The diecasting machine as defined in claim 1, wherein said measuring bore is composed of a relatively large-diameter first bore potion and a relatively small-diameter second bore portion; said second bore portion terminating close to said column; said measuring plug being disposed with a tight fit in said second bore portion.

* * * * *